2,841,566
HIGH POLYMERS WITH CHEMICALLY BONDED REINFORCING AND METHOD OF MAKING SAME

Theodore A. Te Grotenhuis, Olmsted Falls, Ohio, assignor of twenty percent to The General Tire & Rubber Company, Akron, Ohio, a corporation of Ohio No Drawing. Original application August 2, 1952, Serial No. 302,415, now Patent No. 2,742,378, dated April 17, 1956. Divided and this application June 25, 1954, Serial No. 439,463

14 Claims. (Cl. 260—17.4)

This application is a division of my application Serial No. 302,415, filed August 2, 1952, which is a continuation-in-part of my application Serial No. 243,737, filed August 25, 1951, which is a continuation-in-part of my application Serial No. 585,824, filed March 30, 1945, which application was copending with application Ser. No. 593,970, filed May 15, 1945 (now abandoned), and with application Serial No. 559,848, filed October 31, 1944, now Patent 2,457,097, which is a continuation-in-part of application Serial No. 424,493, filed December 26, 1941, now abandoned.

The present invention relates to composite articles of reinforcing material such as pigments and fibers, preferably a matted or woven fabric, and a high molecular weight polymeric substance. It particularly relates to composite articles and methods of preparing such articles comprising a water insoluble inorganic pigment or textile fabric or fibers and in situ polymerized high polymer molecularly bonded to said fabric by interaction of unsaturated linkages on the fiber or pigment surface and of the monomer entering into the solid polymer. The term "polymer" is herein used in its generic sense to include copolymers of one or more monomers.

Composite articles of pigments such as silica, titania, carbon black, etc. and/or fibers such as cellulosic fibers, glass fibers, and the like, and a high polymer such as a polymer of a material comprising a mono-olefinic compound such as styrene, and methyl methacrylate, as a substantial polymerizing ingredient thereof are well-known. Such composite articles in which the pigments, fabric or fibers act as reinforcing agents which should contribute great strength and impact resistance to the articles sometimes have relatively low water resistance or the bond between the water insoluble pigment or fiber and the resin is insufficient to prevent rupture when contacted with certain fluids. The strength of the composite article may also be much less in the dry state than should be the case if proper adhesion of fiber and polymer were obtained. Even thermoset or cross-linked polymers reinforced with fibers and pigments are frequently adversely affected. The result is to limit the utility of the composite article.

It is an object of the present invention to provide reinforced articles of any textile fabric and a high polymeric material formed of a monomer having polymerizable olefinic unsaturation, in which the bond between the fabric and the high polymer may be chemical in nature and therefore much stronger than the usual adhesive forces.

It is another object of the present invention to provide a textile fabric which, when treated with free radical polymerized mono-olefinic monomers or mixtures comprising such monomers can form interlocking chemical bonds therewith.

It is another object of the present invention to provide a method of treating fine particles such as pigments, fibers, and fabrics so that they are readily compounded with organic substances and so that they can be bonded thereto by chemical means such as by possible interpolymerization or by sulfur or chemical bridges.

It is another object of the present invention to provide a method of treatment for fine particles and fibers by which the particles are rendered more readily wettable and interlocked with polymerizable organic compounds and polymers.

It is still another object of the present invention to provide a simple and inexpensive method of improving the ease of dispersion and compounding of fine particles in organic vehicles and polymers.

It is a further object to provide composite articles and a method of making composite articles comprising a solid polymer of a free radical polymerizable unsaturated material reinforced with textile fabric and having the textile fabric molecularly interlocked with said solid polymer. Other objects will be apparent from the following description of the invention.

In accordance with the present invention, and as described in my aforementioned copending application Serial No. 585,824, an alkenyl silicon halide having up to twenty carbon atoms in an organic group is deposited on the surface of the fabric or pulverulent solid. This is most conveniently accomplished by subjecting the surface of the fabric to contact with a reactive organosilicon compound containing at least one allyl group, which is of course characterized by having an olefinic group spaced by a carbon atom from the silicon which carries it, at least one group split off together with H from contacting —OH to form a new silicon-oxygen bond. The preferred organo silicon compounds have the general formula

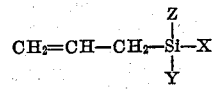

where X is a group which split off with hydrogen from contacting hydroxyl groups with formation of a new silicon-oxygen bond. X is preferably chlorine or bromine, although it may be oxyaryl, oxyaliphatic, or amino ($NH_2$ groups), and Y and Z may be selected from any monovalent organic groups, preferably those hydrocarbons with less than 7 carbon atoms such as allyl, vinyl, phenyl, methyl, etc., and groups split off by reaction with hydroxyl groups and oxgen-containing groups.

This treatment provides on the surface of the fibers the allyl siloxane groups

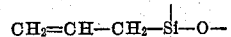

where the free silicon valences are attached to oxygen or carbon and the free oxygen valence is generally attached to the surface of the fiber or pigment. Those compounds having a carbon-to-silicon bond are preferred because of their increased stability at elevated temperatures.

Examples of suitable hydroxyl or water-reactive, aliphatically unsaturated organosilicon compounds are those set forth in my aforementioned copending application Serial No. 585,824, now Patent No. 2,751,369, and especially those having allyl groups for interaction with in situ free radial polymerizable monomer containing compositions such as the water hydrolyzable allyl silicon halides including the mono-, di-, and tri-allyl silicon chlorides, bromides, and amines, the halo-allyl silicon chlorides and bromides such as the chlorallyl silicon chlorides. If more than one organic group is attached to silicon, only one need be an allyl group to enter into the copolymerization with the monomer. Thus, the allyl methyl silicon dichlorides are suitable. Even the partially condensed (liquid) siloxanes appear to be water hydrolyzable or reactive to hydroxyl to shift oxygen and form a new silicon-oxygen bond to the surface of the pigment or fiber.

Although the present invention is not concerned with the preparation of the allyl silicon compounds per se, the organo-silicon compounds which contain a group which is split off by reaction with water because of extreme desire of silicon to form a new silicon-oxygen bond and which contains an allyl group attached to the silicon atom may be prepared in any suitable way as by one or more of the previously proposed methods, for example, the Grignard synthesis wherein the desired organo-halide as for example allyl bromide is reacted with silicon tetrachloride or a mono- or di-organo substituted silicon tetrachloride in the presence of magnesium, etc. The conditions for Grignard reactions are well known in the art.

The preparation or properties of organo-substituted silicon halides (organohalo silicones) is well known and is set forth in one or more of the following United States patents:

Lincoln et al.— 2,129,281
Nason— 2,182,208
Rochow— 2,258,218–19–20–21–22
Rochow—2,286,763
Rochow— 2,352,974
Hyde— 2,371,050
Rochow— 2,371,068

The reinforcing such as the pigment, textile fabric, or other fibrous material used as reinforcing in the composite articles formed in accordance with the present invention may be treated simply by contacting the dry fabric with the hydroxyl water hydrolyzable or condensable silicon compound such as the allyl silicon chlorides or allyl silicon amines, etc. Any method of effecting contact either vapor phase or liquid may be used. The one or more of the reactive silicon compounds (at least those which are relatively non-volatile) are preferably admixed in solution in a non-reactive solvent such for example as a hydrocarbon liquid such as benzene, toluene, or any other diluent that does not react with the silicon halides or amine used. The silicon compound is preferably present in small proportions in the solvent such as .1% to 5% although the reactivity of silicon is such that the extremely dilute solutions are effective. When the silicon compound is liquid, the substantially pure liquid may be used although a dilute solution is more desirable. The reactive silicon compound apparently reacts with hydroxyl or carboxyl groups chemically absorbed or combined with the surface of the fabric to bond allyl groups to the surface thereof through silicon atoms. Such groups are highly compatible with olefinic polymerizable materials and are capable of chemically combining into the molecules formed by the polymerization of such materials. The fibers, fabrics and pigments treated with the solution should be dry and free from water so that reaction with water and hydroxyl not chemically combined or held on the surface of the fibers is avoided. The treated fabric may be neutralized, heated, or washed to eliminate or vaporize traces of acid or ammonia alcohol, etc. or these materials may be volatilized therefrom.

In accordance with the present invention, the fabric or pulverulent inorganic solid which has been treated as above is contacted or immersed in a composition comprising a polymerizable olefinic compound, such as that described in my aforesaid application Serial No. 302,415, now Patent No. 2,742,378, and in my application Serial No. 585,824, now Patent No. 2,751,369, from which the subject matter of this application has been divided. The olefinic compound is preferably a polymerizable styrene or methyl methacrylate which contains conjugated double bonds and containing a free radical initiator such for example as a peroxide and hydroperoxide catalyst, and the polymerizable mono-olefinic compound is subjected to catalyst and caused to polymerize and thus cause the composition to set to the solid state while in contact with the treated fabric whereby interaction of double bonds on fabric and monomer occur to build the fabric chemically into the solid molecule. The mono-olefinic monomer (a styrene or methyl methacrylate) may contain other ingredients such as a polyester, such as the condensation product of a glycol, maleic anhydride and phthalic anhyride, and diallyl phthalate, etc. or polystyrene, etc., dissolved therein to interpolymerize or to interact with the styrene and/or methyl methacrylate in forming the solid polymer. When a solution in the monomeric polymerizable material (for example the styrene and/or methyl methacrylate) of a resinous polymer such for example as polystyrene, polymethyl methacrylate, polymethyl acrylate, or other organic polymerization or condensation product is applied to the surface of the treated fabric or pulverulent solid and the solvent caused to polymerize in situ a more adherent coating may be had to the fabric and a direct chemical union between the fibrous material and the polymerizable or dissolved constituents is usually obtained.

Examples of the most commonly used free radical initiators or catalysts are benzoyl peroxide, cumene hydroperoxide, tertiary butyl hydroperoxide, and other organic peroxides and hydroperoxides. The peroxide, as is well known, is usually used in relatively small amounts such as 1 to 2% of the weight of the polymerizable ingredient, such for example as the monomeric styrene present. Any of the various free radical initiators may be used when soluble or usable in one of the liquids of the method of polymerization used.

The temperature of polymerization is generally dependent on the size of the articles produced and the amount of catalyst present, it being necessary to remove the heat of polymerization. Higher temperatures increase polymerization speed, and cause greater exothermic reaction and may be used in thinner and smaller articles. The polymerization temperature is usually within the range of 50° F. to 200° F. and should be well below the boiling point of monomers present at the pressure used.

The following examples illustrate the present invention.

*Example 1*

A dry, glass fabric which has been previously freed from sizing and dried at 100° C. in a vacuum oven is submerged in a solution in 100 parts of dry toluene of five parts of a mixture of vinyl silicon chlorides having one to three vinyl groups attached directly to silicon and the remaining valences attached to chlorine. The fabric is allowed to stand in the solution for a few minutes, removed and drained free of liquid, and dried in a 75° C. vacuum oven to remove all traces of hydrochloric acid. The thus treated fabric is thereupon immersed into a styrene solution comprising 60 parts of styrene and 40 parts of a polyester prepared by condensing about 30 mol parts of maleic anhydride with 70 mol parts of adipic acid and 102 mol parts of ethylene glycol until a relatively viscous material is obtained, boiling at least 250° C. In effecting the condensation, the ingredients are heated slowly at first under an inert gaseous atmosphere, for example $N_2$, $CO_2$ etc., and the amount of heat applied is merely sufficient to cause vigorous boiling. As the reaction progresses, with elimination of water the temperature rises until a temperature of about 250° C. is obtained. The styrene solution of the polyester is mixed with one part of cumene hydroperoxide as a free radical initiating catalyst and is maintained at slightly elevated temperatures under an atmosphere of nitrogen and with oxygen excluded until a hard solid article is produced having the fabric in situ and intimately bonded through the now polymerized unsaturated linkages to the solid copolymer thus obtained.

Example 2

When several sheets of fabric are wetted as in Example 1 with the solution of unsaturated polyester in styrene and the wetted sheets piled up and pressed against each other and allowed to so remain until the polymerization progressed to the solid state, a laminated structure having exceptionally desirable properties is obtained.

Example 3

In place of the polyester-styrene solution of Example 1, a solution of polystyrene in styrene monomer and having about the same viscosity is substituted, other conditions being the same. An article having fabric bonded to the in situ polymerized polymer is also obtained.

Example 4

The styrene polyester solution of Example 1 is substituted by a viscous solution of polymethylmethacrylate in methacrylate monomer and the polymer, monomer, fiber mixture thus obtained is allowed to polymerize in shape form as in Example 1, except that the temperature was raised to about 80° C. and the catalyst was substituted by 1% based on the weight of the monomer present of benzoyl peroxide, other conditions being the same. A shaped article having fabric or fiber intimately bonded in situ is also obtained.

The vinyl silicon halides in the above examples may be substituted by allyl silicon halides to also produce an integrally bonded composite article having excellent properties. The glass fabric may be substituted for matted glass fibers and other textile fabrics including cotton, rayon, and the like having oxygen containing hydroxyl groups (which of course are present in carboxyl groups) on surface portions thereof, the fabric or fibers in each instance being bonded to the in situ polymerized polymer by interaction of the unsaturated groups and the surface thereof with the monomer during the polymerization thereof. The solution containing the polymerizable monomer of the above examples may be substituted by other monomers or mixtures comprising monomers polymerizable as by homopolymerization, copolymerization, or interpolymerization to the solid state by free radical mechanism.

Example 5

100 grams of unbeaded carbon black are subjected to agitation in the presence of about one gram of a saturated vapor of a mixture of allyl dimethylsilicon chloride and methyl diallylsilicon chloride, the presence of saturated vapor being insured by a reducing of the pressure and elevating the temperature in the container. The agitation is continued in the presence of the organosilicon halide vapor for about 10 minutes to allow thorough penetration of the vapor through the carbon black. The hydrochloric acid formed by the faction is removed in any suitable manner, as for example vaporization at elevated temperature by neutralizing with an alkali material such as dry $NH_3$, by shaking the carbon black with water, or preferably by treating the carbon black with ether and water and washing the carbon black-ether mix until free from acid. The carbon black thus treated has much less tendency to be wet by water and much greater tendency to be wet by hydrocarbon organic solvents and contains allyl groups attached thereto for interpolymerization with free radical polymerizable materials, such as diallyl phthalate and the like.

The pigments in the above example may be substituted by other finely divided pigments including silica, aluminum oxide, titanium oxide, and the like, as well as fibers. Monomers such as styrenes (including styrene, vinyl toluene, etc.), methyl methacrylate, butadiene, and the like are characterized by having a double bond in conjugated relation with the polymerizable olefinic double bond for resonant activation thereof. As described in my said application Serial No. 585,824 and particularly Example 7 of the said patent issued thereon rubbers including "GRS," natural, "Butyl" and neoprene or their vulcanizing agents also react with the said olefine groups of the siloxane on pigment particles to form a chemical bond.

Other pigments and fibers including glass fiber, rayon, cotton, and cellulose fibers having the siloxane units attached to their surface as above noted may be substituted for those in above examples.

The term "polymerization" is here used and in the appended claims in the usual generic sense to include copolymerization; similarly the term "polymer" is used in the usual sense to include copolymers, whether of the olefine-reactive addition type or of the olefine-reactive condensation type. The terms "pulverulent inorganic solids and pigments" are used in their broadest sense to include inorganic pigments, inorganic powders and inorganc pulverizable solids, regardless of coloring value.

It is to be understood that in accordance with the provisions of the patent statutes, variations and modifications of the specific examples herein described for purposes of illustration may be made without departing from the spirit of the invention.

What I claim is:

1. A method of forming a composite article comprising a mass of a member of the group consisting of inorganic pulverulent solids and fibers bonded to a resinous polymer polymerized in situ to the solid state which comprises wetting said group member with a polymerizable liquid in a continuous phase and comprising a monomeric polymerizable styrene and without agitation causing polymerization of said monomeric styrene in contact wth said group member and in a continuous phase, said group member being characterized by having attached to surface portions thereof a coupling compound comprising an allyl siloxane group, the body of said group member and the body of said resinous polymer being different.

2. A method of forming a shaped composite article comprising a member of the group consisting of fibers and pulverulent inorganic solids bonded together in a mass through a solid polymer of a liquid comprising an olefinic compound having at least one pair of olefinic double bonds in conjugation with another pair of bonds, whereby said olefinic double bonds are activated toward polymerization, said polymer being in situ polymerized to the solid state, said method comprising wetting said surfaces with said liquid having said olefinic compound in a continuous phase and having in admixture therewith a free radical forming polymerization catalyst maintaining said liquid in contact with said surfaces and in a continuous phase until it is solidified to the solid state, agitation being absent during change of said liquid from the flowable to the solid state, said surfaces being characterized by having attached thereto a coupling compound comprising an allyl siloxane group, the body of said solids having said surfaces and the body of said solid polymer being different both from said coupling compound and from each other.

3. The method of claim 2 wherein said olefinic compound is methyl methacrylate.

4. A method of bonding textile fibers having hydroxyl groups on their surfaces to a polymer of a liquid comprising a styrene which comprises reacting said hydroxyl groups on the surface of said fibers with a hydroxy reactive allyl silicon compound having an allyl group directly attached to silicon and a hydroxyl reactive group directly attached to silicon to bond allyl siloxane groups to the surface of said fibers, thereafter contacting the surface of said fibers with a liquid mixture polymerizable to the solid state and comprising a styrene in a continuous phase and polymerizing said liquid while in the continuous phase to the solid state in contact with the surface of said fibers, the solidification of said liquid occurring without agitation, whereby said allyl groups are subject to interpolymerization with polymerizable constituents of said liquids to chemically bond the in situ formed solid polymer to the surface of said textile fibers through the silicon-oxygen linkages of said allyl siloxane groups.

5. A composite article comprising an in situ polymerized solid polymer of a liquid comprising an olefinic compound with conjugated double bonds in a continuous phase, textile fibers in contact with said solid polymer and an interfacial coupling compound bonded to said textile fibers and to said solid polymer, said interfacial compound being different both from the body of said fibers and the mass of said solid polymer, said interfacial compound comprising the product from the polymerization of said olefinic compound in contact with the allyl siloxane groups on the surface of said fibers, said allyl groups being attached directly to silicon and being bonded to said fibers through silicon oxygen linkages.

6. A composite article comprising an in situ polymerized solid polymer of a liquid comprising a monomeric polymerizable styrene in a continuous phase, textile fibers for reinforcing the same and an interfacial coupling compound bonded to said textile fibers and in chemical combination with said solid polymer, said interface being different from both the mass of said solid polymer and from the body of said textile fibers and comprising a product of the interpolymerization of said styrene with allyl groups of allyl siloxane groups bonded to the surface of said fibers.

7. A composite article comprising an in situ polymerized solid polymer of a liquid comprising a monomeric polymerizable methyl methacrylate in a continuous phase, textile fibers for reinforcing the same and an interface comprising a coupling compound bonded to said textile fibers and in chemical combination with said solid polymer, said interface being different from both the mass of said solid polymer and from the body of said textile fibers and comprising a product of the interpolymerization of said methyl methacrylate with allyl siloxane groups on the surfaces of said fibers.

8. A method of forming a composite article comprising inorganic surfaces bonded together through an in situ formed solid polymer of a liquid comprising a monoolefinic compound having olefinic double bonds conjugated with double bonds, said method comprising wetting said surfaces with said liquid having said monoolefinic compound in a continuous phase and having in admixture therewith a free radical forming polymerization catalyst maintaining a mass of said liquid as a continuous phase in contact with said surfaces without agitation until it is solidified to the solid state to bond said surfaces together, said surfaces being characterized by having attached thereto a coupling compound comprising an olefinically unsaturated organosiloxane group in which carbon-to-carbon double bonds are spaced by at least one carbon atom from the silicon atom carrying the organic group of said organosiloxane group, the body of said solids having said surfaces and the body of said solid polymer being different both from said coupling compound and from each other, said olefinically unsaturated group being an alkylenyl group having not over twenty carbon atoms.

9. A composite article comprising an in situ polymerized solid polymer of a liquid comprising an olefinic compound in a continuous phase with conjugated double bonds, textile fibers in contact with said solid polymer and an interfacial coupling compound of not more than twenty carbon atoms in an alkylenyl group bonded to said textile fibers and to said solid polymer, said interfacial compound being different both from the body of said fibers and the mass of said solid polymer, said interfacial compound comprising the product from the polymerization of said olefinic compound in contact with an olefinically unsaturated organosiloxane group which has olefinic unsaturation in which carbon-to-carbon double bonds are spaced by one, and only one carbon atom from the silicon atom carrying the organic group of said organosiloxane group on the surface of said fibers, said groups being attached directly to silicon and being bonded to said fibers through silicon-oxygen linkages.

10. A composite article comprising a mass of nonfibrous inorganic solid particles bonded together through a continuous phase of solid polymer of a continuous phase of olefinic-reactive polymerized liquid in situ polymerized to the solid state, said particles having an interfacial coupling compound bonded to the surface thereof and chemically bonded to a continuous phase of said in situ solidified solid polymer, said interfacial compound being different from both the body of said inorganic solid particles and from the mass of said solid polymer uniting said inorganic solid particles together, and comprising the reaction product of said solid polymer during the solidification thereof with

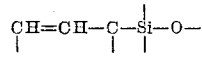

groups on the surface of said inorganic solid particles, where the silicon is connected directly only to a member of the group consisting of hydrocarbon groups and oxygen and the silicon-oxygen linkage bonds the hydrocarbon groups to the surface of said pulverulent inorganic solid particles.

11. A composite article comprising a binder of an in situ polymerized solid resinous polymer of an olefinic compound having at least one pair of olefinic double bonds in conjugation with another pair of double bonds, a member of the group consisting of textile fibers and pulverulent inorganic solids in said polymer and bound together by in situ polymerization of said polymer, and an interfacial coupling compound bonded to said group member and chemically combined by in situ interpolymerization of said olefinic compound while in a continuous phase and in contact with said coupling compound, said interfacial compound being different from both the body of said group members and the mass of said solid polymer, said interfacial compound comprising the product resulting from the polymerization of said olefinic liquid in contact with allyl siloxane groups on the surface of said group member, said allyl groups of said allyl siloxane groups being bonded to said group member through silicon-oxygen linkages.

12. An article according to claim 11 wherein said olefinic compound is styrene and wherein an inorganic powder is bonded to the polymerization product thereof.

13. An article according to claim 11 wherein said olefinic compound is styrene.

14. An article according to claim 11 wherein said olefinic compound is methyl methacrylate.

References Cited in the file of this patent

UNITED STATES PATENTS

| | | |
|---|---|---|
| 2,030,739 | Bley | Feb. 11, 1936 |
| 2,258,219 | Rochow | Oct. 7, 1941 |
| 2,306,222 | Patnode | Dec. 22, 1942 |
| 2,352,974 | Rochow | July 4, 1944 |
| 2,377,600 | Marker | June 5, 1945 |
| 2,394,025 | Te Grotenhuis | Feb. 5, 1946 |
| 2,424,853 | Stafford | July 29, 1947 |
| 2,436,304 | Johannson | Feb. 17, 1948 |
| 2,439,689 | Hyde | Apr. 13, 1948 |
| 2,465,731 | Kropa | Mar. 29, 1949 |
| 2,505,431 | Rust | Apr. 25, 1950 |
| 2,557,786 | Johannson | June 19, 1951 |
| 2,563,288 | Steinman | Aug. 7, 1951 |
| 2,628,246 | MacKenzie et al. | Feb. 10, 1953 |
| 2,751,369 | Te Grotenhuis | June 19, 1956 |